US012499859B2

(12) United States Patent
Qiao

(10) Patent No.: US 12,499,859 B2
(45) Date of Patent: Dec. 16, 2025

(54) INTELLIGENT SINGING BOWL

(71) Applicant: Zheng Qiao, Shenzhen (CN)

(72) Inventor: Zheng Qiao, Shenzhen (CN)

(73) Assignee: Beijing Zhirun Technology Co., Ltd., Beijing (CN)

( * ) Notice: Subject to any disclaimer, the term of this patent is extended or adjusted under 35 U.S.C. 154(b) by 0 days.

(21) Appl. No.: 19/300,691

(22) Filed: Aug. 15, 2025

(65) Prior Publication Data

US 2025/0372071 A1 Dec. 4, 2025

(51) Int. Cl.

*G10K 1/076* (2006.01)
*G10K 1/062* (2006.01)
*G10K 1/10* (2006.01)
*G10K 1/26* (2006.01)

(52) U.S. Cl.

CPC ............. *G10K 1/076* (2013.01); *G10K 1/062* (2013.01); *G10K 1/10* (2013.01); *G10K 1/26* (2013.01)

(58) Field of Classification Search

CPC .......... G10K 1/076; G10K 1/062; G10K 1/10; G10K 1/26
USPC ....................................................... 340/398.2
See application file for complete search history.

(56) References Cited

U.S. PATENT DOCUMENTS 8,492,632 B1 * 7/2013 Doe ........................ G10D 13/08 84/406
2006/0249004 A1 * 11/2006 Bunker .................. G10D 13/16 84/410
2009/0326424 A1 * 12/2009 Shrestha ............ A61H 23/0236 601/47
2020/0027434 A1 * 1/2020 Becker ................... G10K 1/072

* cited by examiner

*Primary Examiner* — Kerri L McNally

(57) ABSTRACT

An intelligent singing bowl includes a base, a sound production element, a supporting element, a knocking element and a driving element. The sound production element is connected to an upper surface of the base. The supporting element is connected to the base and extends upwards from the base. A bottom end of the knocking element is located on one side of the sound production element. The driving element is located inside the supporting element; the driving element includes a rotating shaft, an electromagnetic clutch, and a motor; a top end of the knocking element is rotatably connected to a middle of the rotating shaft; the electromagnetic clutch and the motor are respectively connected to two ends of the rotating shaft; the electromagnetic clutch attracts or releases the rotating shaft; when the electromagnetic clutch attracts the rotating shaft, the rotating shaft is fixedly connected to the knocking element.

20 Claims, 8 Drawing Sheets

INTELLIGENT SINGING BOWL

CROSS-REFERENCE TO RELATED APPLICATIONS

The application claims priority of Chinese patent application CN202521691272.0, filed on Aug. 8, 2025, which is incorporated herein by reference in its entireties.

TECHNICAL FIELD

The present disclosure relates to the technical field of singing bowls, and in particular, to a singing bowl capable of outputting knocking sounds with different volumes and frequencies.

BACKGROUND OF THE INVENTION

A singing bowl is a traditional percussion instrument, which is widely used in fields such as meditation, yoga, musical treatment, and religious rites. The traditional singing bowl produces a long and ethereal resonant timbre through knocking or rubbing, and has functions of relaxing the body and mind, regulating emotions, improving concentration, and the like.

At present, it is common to manually knock the singing bowl to produce sounds. However, since knocking the singing bowl needs to be performed by an experienced person with a sense of rhythm, needs of most people cannot be met in real time. In addition, there is also a device on the market, a bowl body of which is knocked to produce sounds by using a mechanical device. However, the mechanical device can only implement knocking sound production with a fixed frequency and volume. In addition, a user needs to manually turn on and turn off the mechanical device. The user cannot control a frequency, volume, and duration of sound production of the singing bowl through the mechanical device itself, so that the mechanical singing bowl device cannot be applied to a variety of usage scenarios.

For this reason, the present disclosure provides an intelligent singing bowl, which can effectively solve the above problems. The intelligent singing bowl has a simple structure and is convenient to operate. The intelligent singing bowl has a controllable knocking volume and an adjustable frequency.

SUMMARY OF THE INVENTION

In order to overcome the shortcomings in the prior art, the present disclosure provides an intelligent singing bowl which has a simple structure and a good sealing effect.

The technical solution adopted by the present disclosure to solve the technical problem is as follows.

An intelligent singing bowl includes a base, a sound production element, a supporting element, a knocking element and a driving element. The sound production element is connected to an upper surface of the base.

The supporting element is connected to the base and extends upwards from the base.

A bottom end of the knocking element is located on one side of the sound production element.

The driving element is located inside the supporting element; the driving element includes a rotating shaft, an electromagnetic clutch, and a motor; a top end of the knocking element is rotatably connected to a middle of the rotating shaft; the electromagnetic clutch and the motor are respectively connected to two ends of the rotating shaft; the electromagnetic clutch attracts or releases the rotating shaft; when the electromagnetic clutch attracts the rotating shaft, the rotating shaft is fixedly connected to the knocking element; and the motor drives the rotating shaft to rotate, to enable the rotating shaft to drive the knocking element to rotate synchronously.

As an improvement of the present disclosure, the intelligent singing bowl further includes a control element, the control element controls a rotation angle and rotation frequency of the knocking element.

As an improvement of the present disclosure, the electromagnetic clutch includes an electromagnetic assembly; the electromagnetic assembly is connected to the knocking element; and after the electromagnetic clutch is turned on, the electromagnetic assembly attracts at least a part of the rotating shaft, to enable the rotating shaft to drive the knocking element to rotate synchronously.

As an improvement of the present disclosure, the electromagnetic clutch further includes a first gear connected to the knocking element; the first gear is fixedly connected to the electromagnetic assembly; and the electromagnetic assembly is connected to the knocking element through the first gear, to enable the rotating shaft to drive the knocking element to rotate synchronously.

As an improvement of the present disclosure, the driving element further includes a transmission member connected to the knocking element; a second gear that meshes with the first gear is arranged at one end of the transmission member; and the first gear is connected to the knocking element through the transmission member, to enable the rotating shaft to drive the knocking element to rotate synchronously.

As an improvement of the present disclosure, the rotating shaft is located inside the transmission member; a connection protruding column is arranged at a top end of the knocking element; the connection protruding column is connected to an outer wall of the transmission member; and the transmission member is connected to the knocking element through the connection protruding column, to enable the rotating shaft to drive the knocking element to rotate synchronously.

As an improvement of the present disclosure, an output end is arranged at one end of the motor that is close to the rotating shaft; the rotating shaft is provided with an output channel that accommodates the output end; and the output end is in interference insertion into the output channel, to enable the motor to drive the rotating shaft to rotate synchronously through the output end.

As an improvement of the present disclosure, a rotating shaft channel is arranged in the electromagnetic clutch, and at least a part of the rotating shaft is inserted into the rotating shaft channel.

As an improvement of the present disclosure, the driving element further includes a spigot; and the spigot is adjacent to the motor, and sleeves an outer surface of the output end to restrict movement of the output end.

As an improvement of the present disclosure, the driving element further includes oppositely arranged stoppers; the stoppers sleeve an outer wall of the rotating shaft; and outer walls of the stoppers resist against an inner wall of the transmission member to restrict movement of the rotating shaft.

As an improvement of the present disclosure, the supporting element is provided with a swinging channel that allows the knocking element to swing.

The intelligent singing bowl further includes a switch button. As an improvement of the present disclosure, the intelligent singing bowl further includes a switch button, after the switch button generates a signal, the control element receives the signal to control turning on or turning off of the intelligent singing bowl.

As an improvement of the present disclosure, the intelligent singing bowl further includes at least one control button, the control button is electrically connected to the control element; and the control button is configured to adjust the rotation angle, rotation frequency, and operating time of the knocking element.

As an improvement of the present disclosure, the intelligent singing bowl further includes a display screen, the display screen is electrically connected to the control element; and the display screen displays the rotation angle, rotation frequency, and operating time of the knocking element in real time.

As an improvement of the present disclosure, the intelligent singing bowl further includes a charging port, the intelligent singing bowl is charged through the charging port.

As an improvement of the present disclosure, the intelligent singing bowl further includes a battery, the battery is located inside the base, and the charging port is configured to be connected with an external power source to supply power to the battery.

As an improvement of the present disclosure, the base is provided with a mounting slot, and a bottom end of the sound production element is movably connected to the mounting slot.

As an improvement of the present disclosure, at least a part of a bottom surface of the base is of a planar structure for resisting against a supporting surface, and the bottom surface of the base is provided with an antislip member.

As an improvement of the present disclosure, the supporting element and the base are of an integrated structure.

As an improvement of the present disclosure, the motor is a stepping motor, and the electromagnetic clutch is a gear electromagnetic clutch.

By the arrangement of the above structure, during use, the electromagnetic clutch is powered on to attract the rotating shaft, so that the rotating shaft is fixedly connected to the knocking element. In this case, the motor drives the rotating shaft to rotate, thereby driving the knocking element to swing to the preset angle towards a side away from the sound production element. After the knocking element swings to the preset angle, the electromagnetic clutch and the motor are turned off, and the rotating shaft is no longer connected to the knocking element. The knocking element swings back only under the action of the gravity, and then knocks the sound production element for sound production. By repeatedly controlling an on or off frequency of the electromagnetic clutch and the motor, a knocking frequency of the knocking element can be controlled. A volume of the singing bowl depends on a swinging angle of the knocking element: a larger angle indicates greater potential energy, a higher knocking force, and a higher volume. By combining the driving of the motor, the control of the electromagnetic clutch, and a gravity knocking mechanism, an intelligent singing bowl with a controllable knocking volume and an adjustable frequency is implemented.

BRIEF DESCRIPTION OF DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
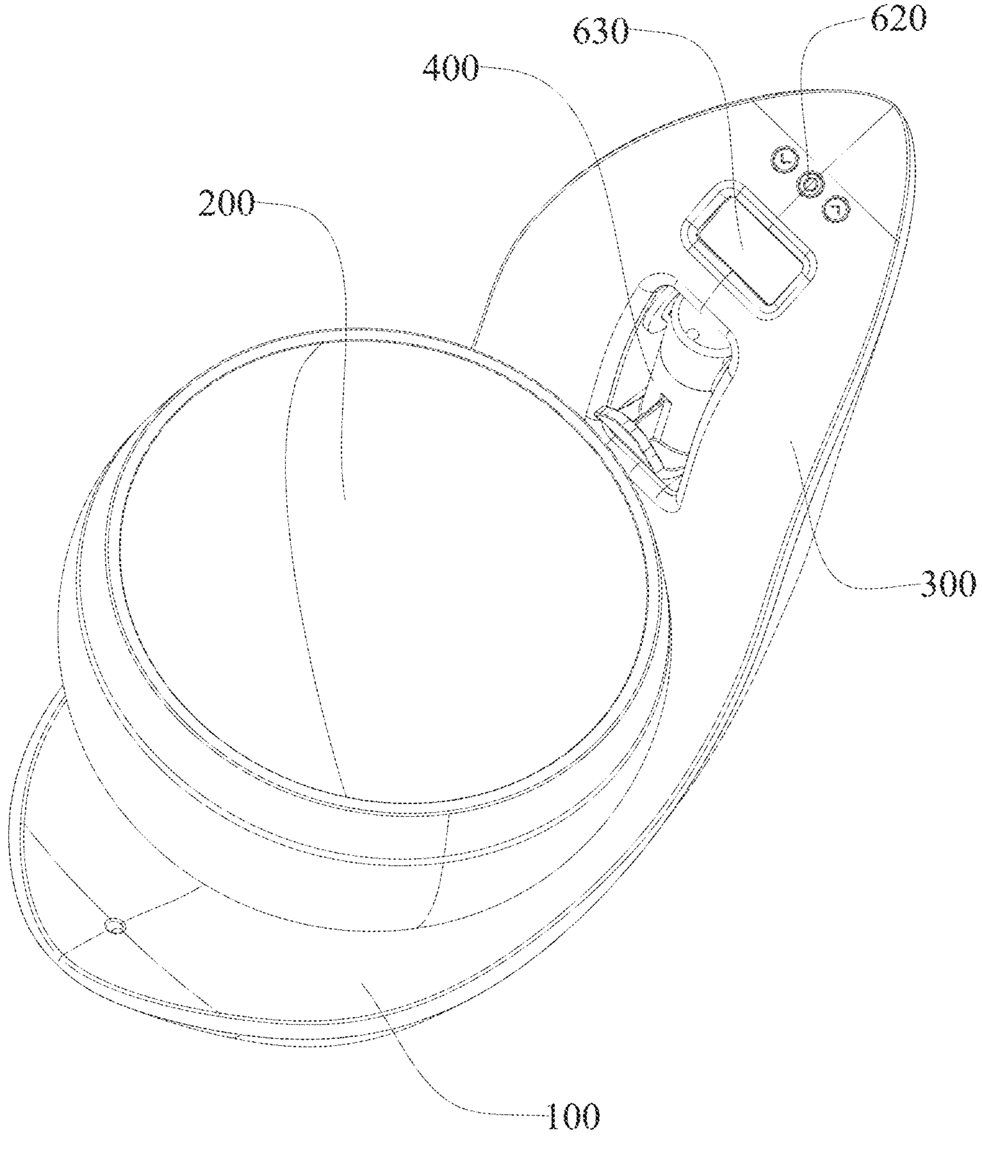
FIG. 1 is a schematic diagram of an entire structure of a singing bowl according to the present disclosure in an angle.

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, It is to be understood that, The terms “center”, “longitudinal”, “transverse”, “upper”, “lower”, “front”, “rear”, “left”, “right”, “vertical”, “horizontal”, “top”, “bottom”, “inner”, “outer”, “clockwise”, “counterclockwise”, and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, the terms “first” and “second” are used for descriptive purposes only, while not to be construed as indicating or implying relative importance or implicitly specifying the number of technical features indicated thereby, features defining “first,” “second,” and “second”

may explicitly or implicitly include one or more of the described features. In the description of the present disclosure, “multiple” means two or more unless explicitly specified otherwise.

In addition, the terms “install”, “arrange”, “provide”, “connect” and “couple” should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In the present disclosure, unless specific regulation and limitation otherwise, the first feature “onto” or “under” the second feature may include the direct contact of the first feature and the second feature, or may include the contact of the first feature and the second feature through other features between them instead of direct contact. Moreover, the first feature “onto”, “above” and “on” the second feature includes that the first feature is right above and obliquely above the second feature, or merely indicates that the horizontal height of the first feature is higher than the second feature. The first feature “under”, “below” and “down” the second feature includes that the first feature is right above and obliquely above the second feature, or merely indicates that the horizontal height of the first feature is less than the second feature.

It should be noted that when an element is referred to as being “fixed to” another element, the element can be directly on another component or there can be a centered element. When an element is considered to be “connected” to another element, the element can be directly connected to another element or there may be a centered element. The terms “inner”, “outer”, “left”, “right”, and similar expressions used herein are for illustrative purposes only and do not necessarily represent the only implementation.

Figure 2:
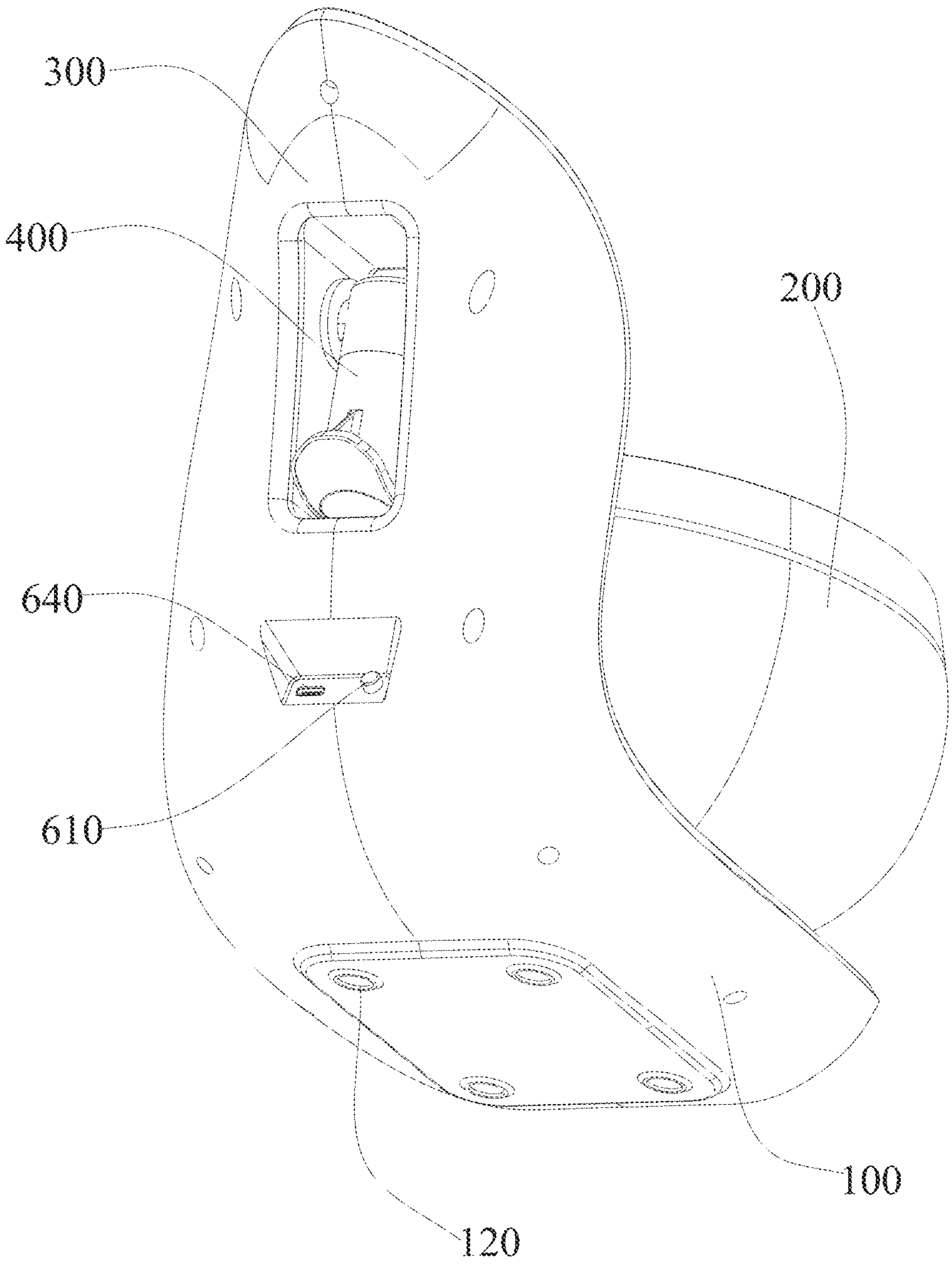
FIG. 2 is a schematic diagram of an entire structure of a singing bowl according to the present disclosure in another angle.
Figure 3:
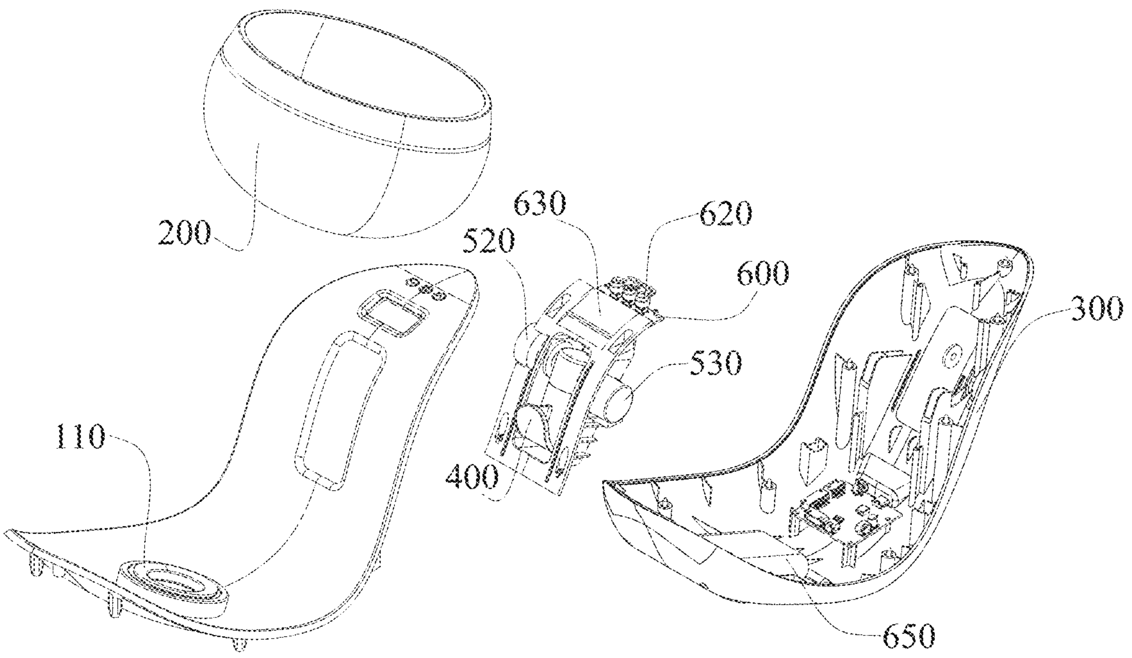
FIG. 3 is a schematic diagram of an exploded structure of a singing bowl according to the present disclosure in an angle.
Figure 4:
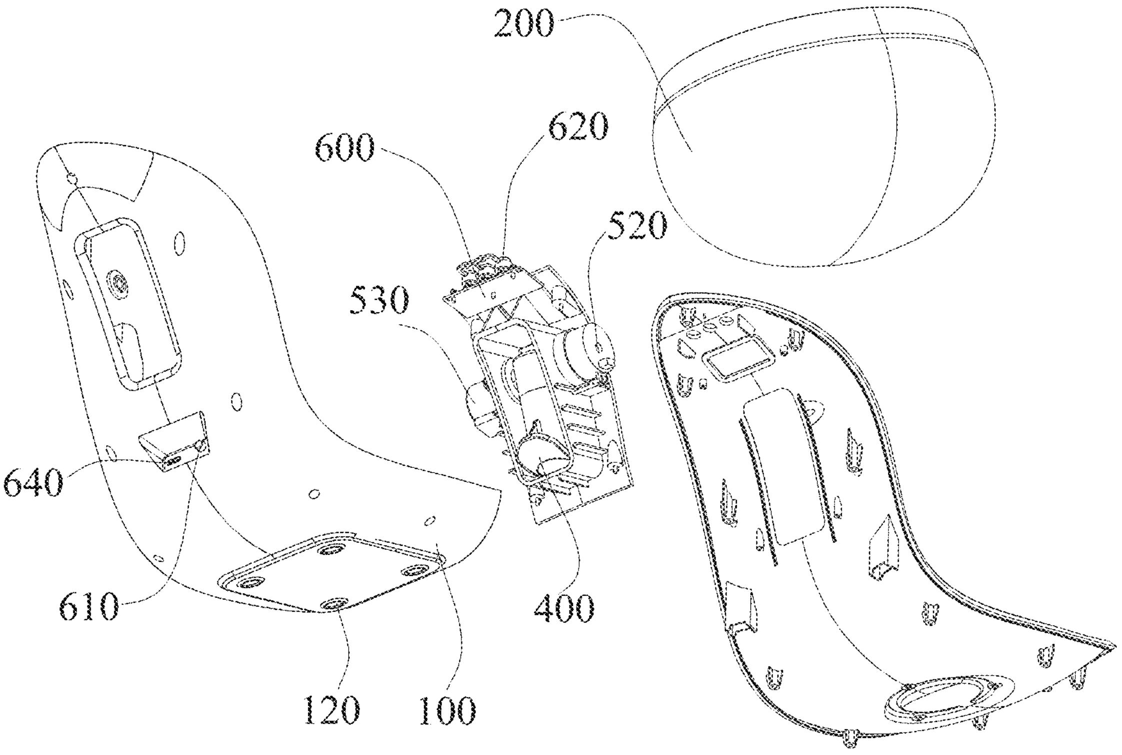
FIG. 4 is a schematic diagram of an exploded structure of a singing bowl according to the present disclosure in another angle.
Figure 5:
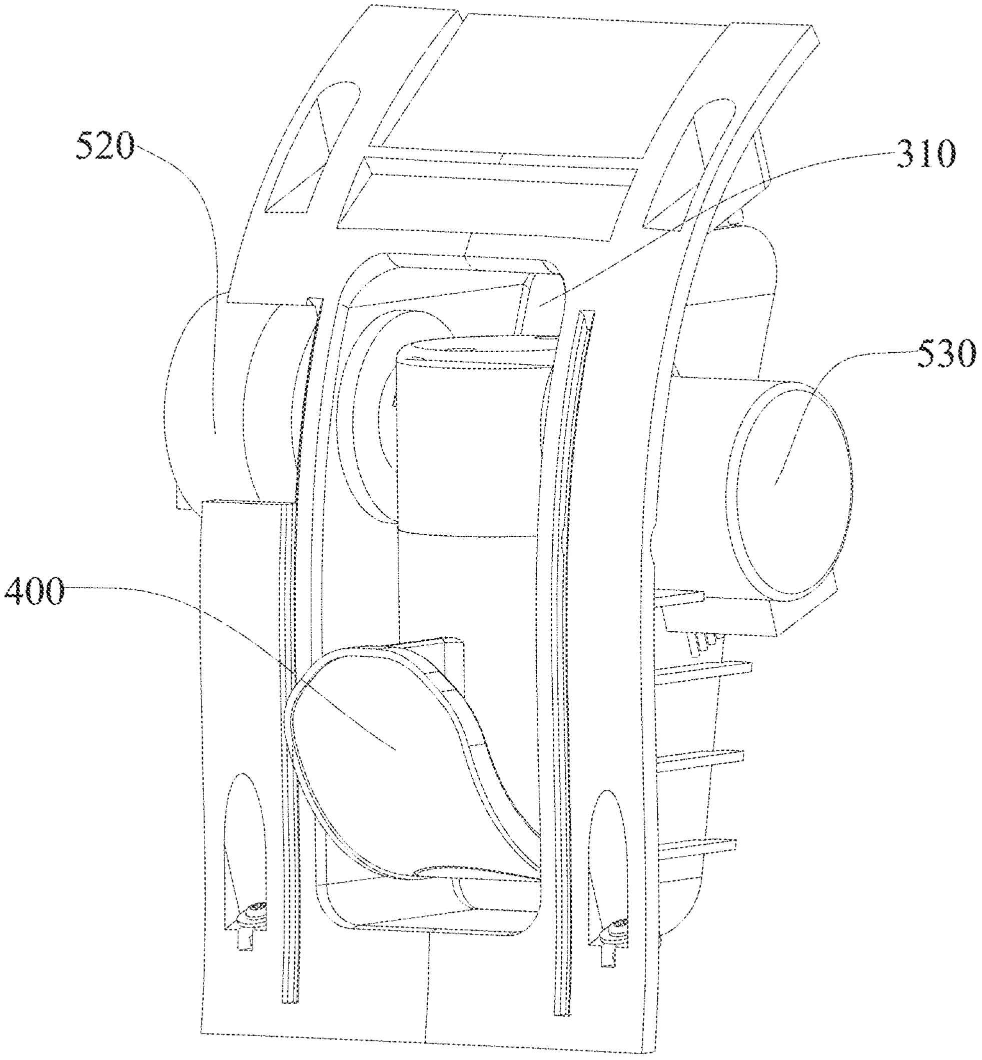
FIG. 5 is a schematic structural diagram of a driving element and a knocking element of a singing bowl according to the present disclosure.
Figure 6:
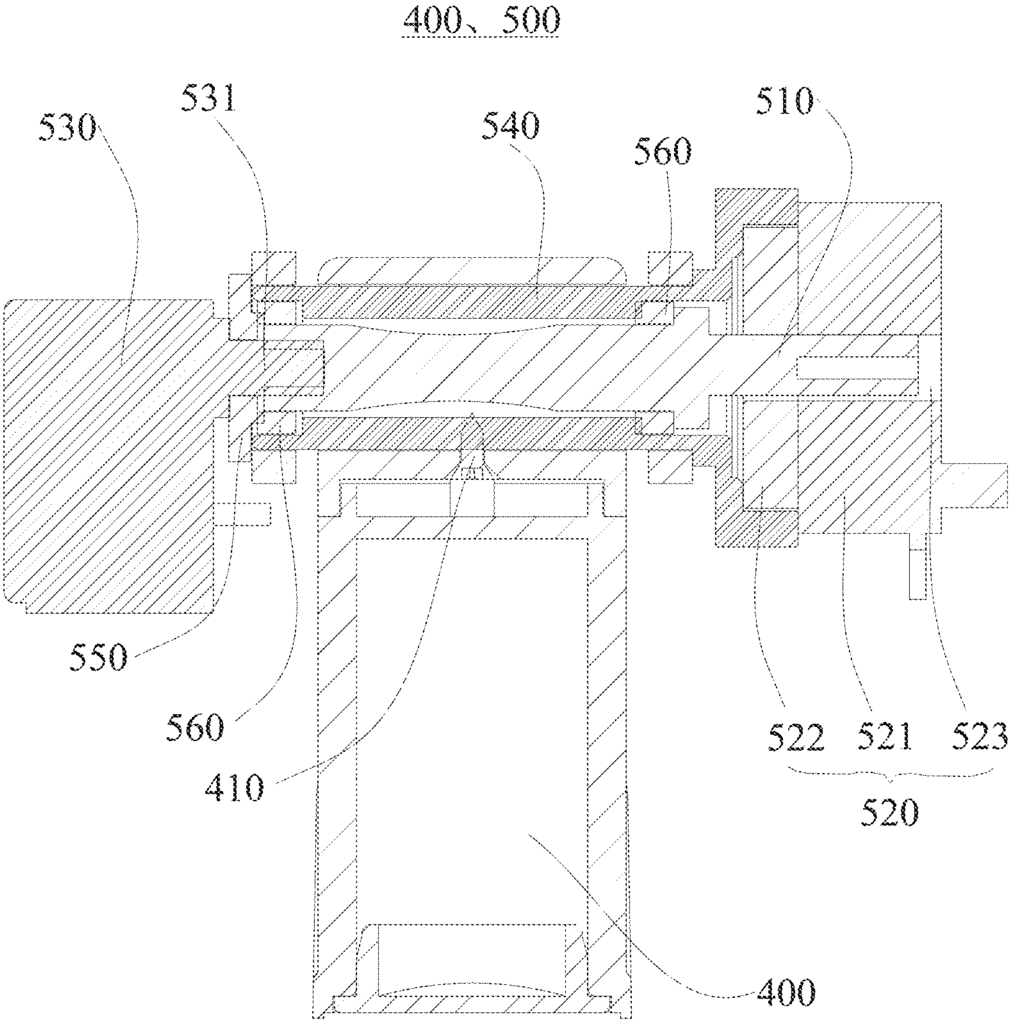
FIG. 6 is a schematic diagram of a cross-sectional structure of a driving element and a knocking element of a singing bowl according to the present disclosure.
Figure 7:
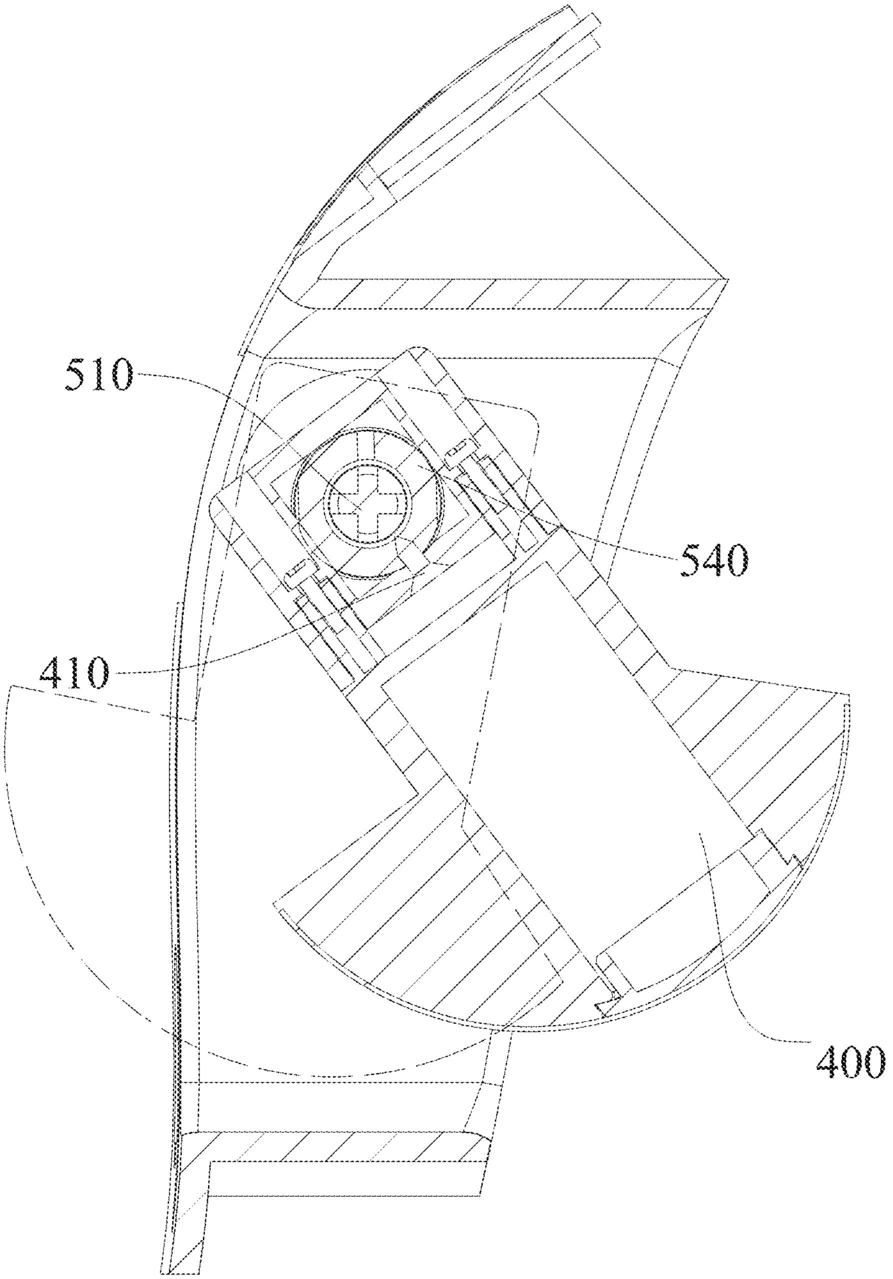
FIG. 7 is a schematic diagram of a cross-sectional structure of a driving element and a knocking element of a singing bowl in an operating state according to the present disclosure.
Figure 8:
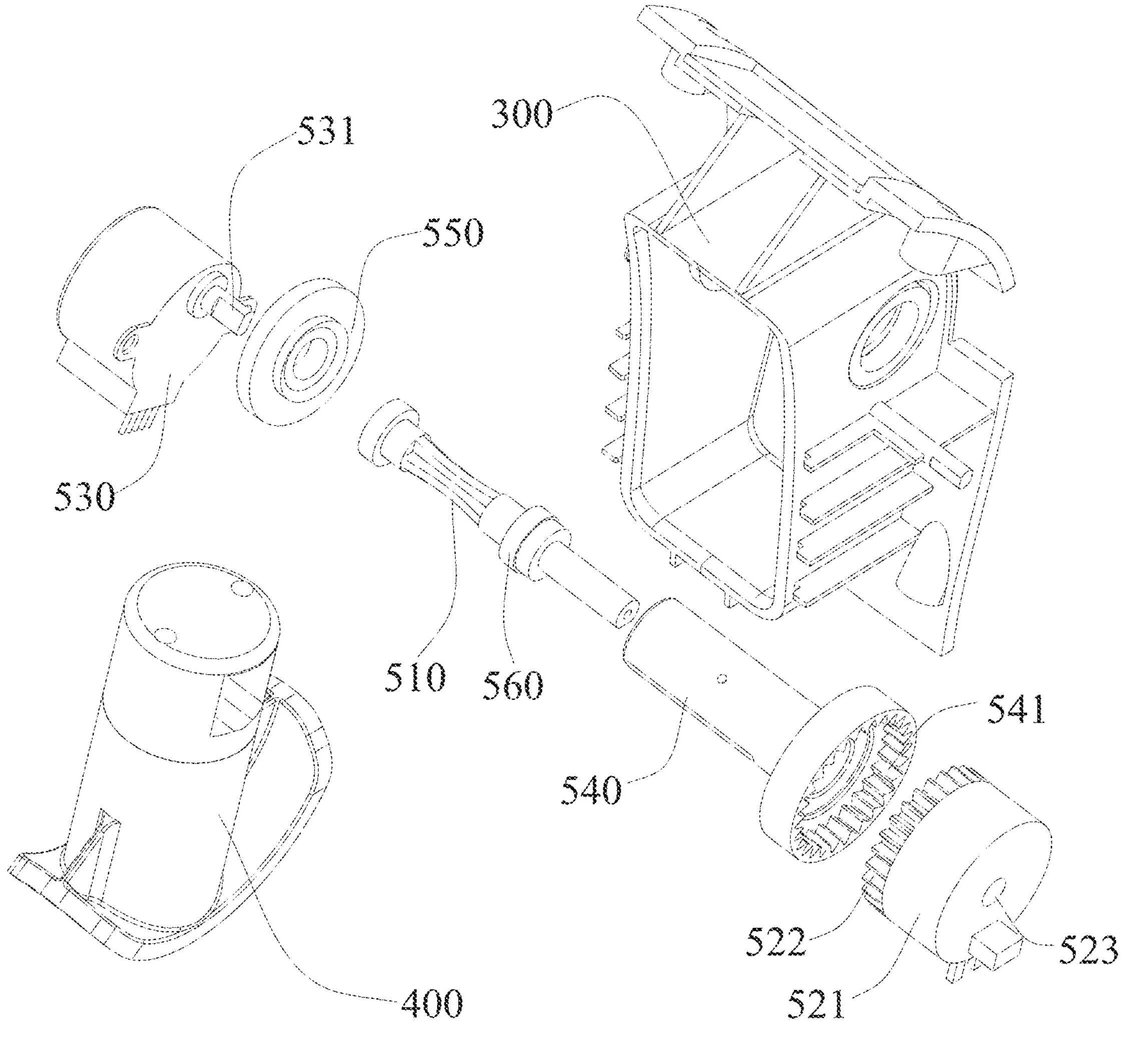
FIG. 8 is a schematic diagram of a partially exploded structure of a singing bowl according to the present disclosure in an angle.
Figure 9:
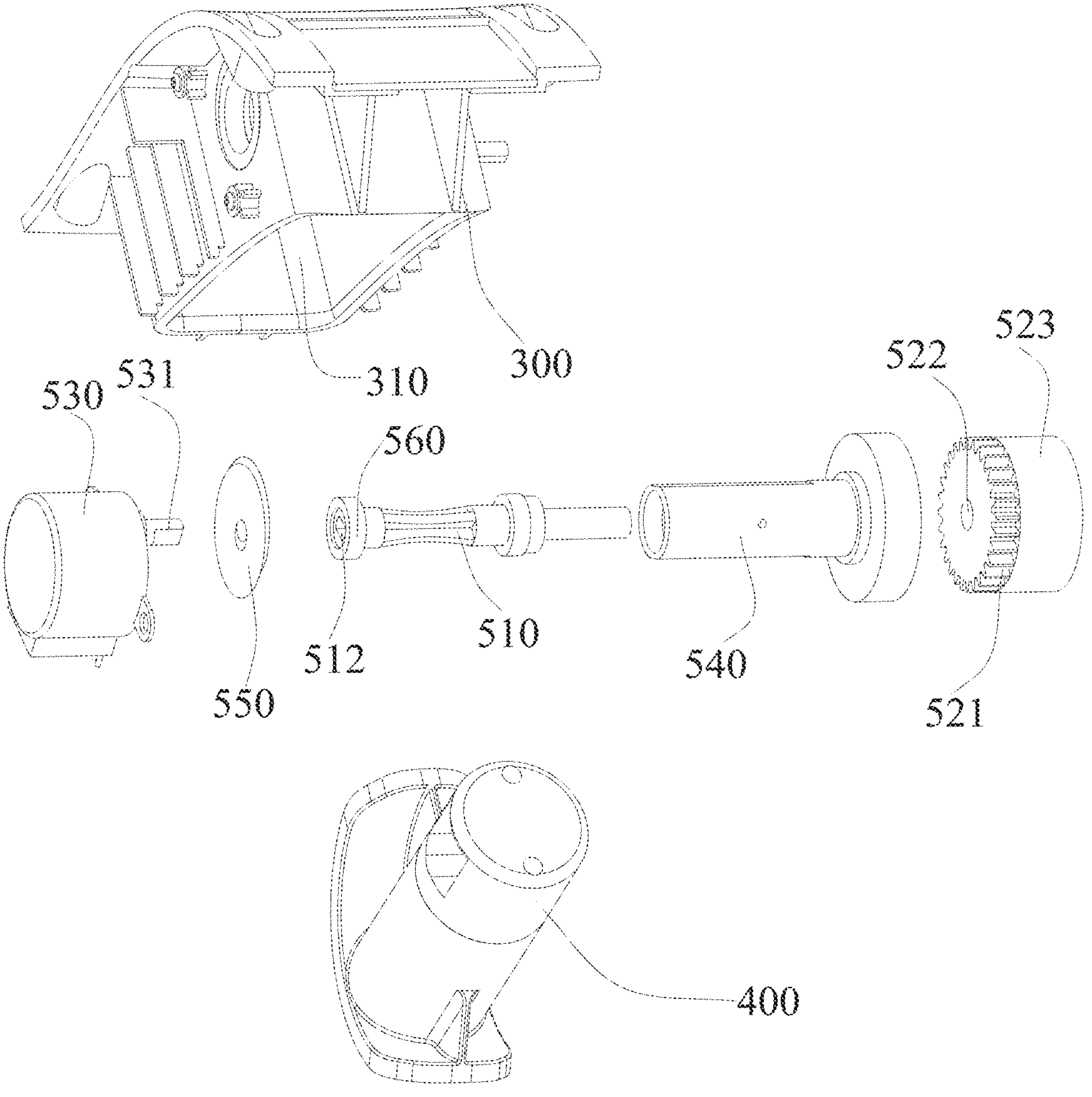
FIG. 9 is a schematic diagram of a partially exploded structure of a singing bowl according to the present disclosure in another angle.

Referring to FIG. 1 to FIG. 9, an intelligent singing bowl includes:

- a base 100;
- a sound production element 200, where the sound production element 200 is connected to an upper surface of the base 100;
- a supporting element 300, where the supporting element 300 is connected to the base 100 and extends upwards from the base 100;
- a knocking element 400, where a bottom end of the knocking element 400 is located on one side of the sound production element 200; and
- a driving element 500, where the driving element 500 is located inside the supporting element 300; the driving element 500 includes a rotating shaft 510, an electromagnetic clutch 520, and a motor 530; a top end of the knocking element 400 is rotatably connected to a middle of the rotating shaft 510; the electromagnetic clutch 520 and the motor 530 are respectively connected to two ends of the rotating shaft 510; the electromagnetic clutch 520 attracts or releases the rotating shaft 510 after being turned on; when the electromagnetic clutch 520 attracts the rotating shaft 510, the rotating shaft 510 is fixedly connected to the knocking element 400; and the motor 530 drives the rotating shaft 510 to rotate, to enable the rotating shaft 510 to drive the knocking element 400 to rotate synchronously.

By the arrangement of the above structure, the base 100, as a basic supporting structure, provides a stable supporting platform for the entire singing bowl. The sound production element 200 is fixed on the upper surface of the base 100 and is a core component of the singing bowl for sound production. The supporting element 300 extends upwards from the base 100, to provide a mounting and movement space for the driving element 500 and the knocking element 400 and to also play a supporting and guiding role. The bottom end of the knocking element 400 is close to the side of the sound production element 200, and the top end of the knocking element 400 is rotatably connected through the rotating shaft 510, so that the knocking element 400 can swing to a preset angle under the driving of the motor 530 and the driving element 500, and then fall back by the gravity, to knock the sound production element 200 for sound production. During use, the electromagnetic clutch 520 is powered on to attract the rotating shaft 510, so that the rotating shaft 510 is fixedly connected to the knocking element 400. In this case, the motor 530 drives the rotating shaft 510 to rotate, thereby driving the knocking element 400 to swing to the preset angle towards a side away from the sound production element 200. After the knocking element 400 swings to the preset angle, the electromagnetic clutch 520 and the motor 530 are turned off, and the rotating shaft 510 is no longer connected to the knocking element 400. The knocking element 400 swings back only under the action of the gravity, and then knocks the sound production element 200 for sound production. By repeatedly controlling an on or off frequency of the electromagnetic clutch 520 and the motor 530, a knocking frequency of the knocking element 400 can be controlled. A volume of the singing bowl depends on a swinging angle of the knocking element 400: a larger angle indicates greater potential energy, a higher knocking force, and a higher volume. By combining the driving of the motor 530, the control of the electromagnetic clutch 520, and a gravity knocking mechanism, an intelligent singing bowl with a controllable knocking volume and an adjustable frequency is implemented.

In this embodiment, the intelligent singing bowl further includes a control element 600. The control element 600 controls a rotation angle and rotation frequency of the knocking element 400. By the arrangement of the above structure, the control element 600 can transmit a corresponding control signal to the motor 530 and the electromagnetic clutch 520 according to a preset program, thereby implementing precise control on the rotation angle and operating frequency of the knocking element 400.

In this embodiment, the electromagnetic clutch 520 includes an electromagnetic assembly 521. The electromagnetic assembly 521 is connected to the knocking element 400. After the electromagnetic clutch 520 is turned on, the electromagnetic assembly 521 attracts at least a part of the rotating shaft 510, to enable the rotating shaft 510 to drive the knocking element 400 to rotate synchronously. By the arrangement of the above structure, the electromagnetic assembly 521 is a key component of the electromagnetic clutch 520 that generates a magnetic force to implement power engagement. After the electromagnetic clutch 520 is turned on after being powered on, the electromagnetic assembly 521 generates a magnetic field that can attract the rotating shaft 510 and cause the rotating shaft 510 to be magnetically connected to the electromagnetic assembly 521. While the motor 530 drives the rotating shaft 510 to rotate, due to the magnetic connection, the rotating shaft 510 can also drive the electromagnetic assembly 521 to rotate synchronously. After the electromagnetic clutch 520 is turned off, the electromagnetic assembly 521 no longer generates a magnetic field, and the rotating shaft 510 cannot be magnetically connected to the electromagnetic assembly 521, so that there is no connection relationship between them.

In this embodiment, the electromagnetic clutch 520 further includes a first gear 522 connected to the knocking element 400. The first gear 522 is fixedly connected to the electromagnetic assembly 521. The electromagnetic assembly 521 is connected to the knocking element 400 through the first gear 522, to enable the rotating shaft 510 to drive the knocking element 400 to rotate synchronously. By the arrangement of the above structure, the first gear 522 is fixedly connected to the electromagnetic assembly 521. After the electromagnetic clutch 520 is turned on, the rotating shaft 510 is in attracting connection to the electromagnetic assembly 521. When the motor 530 drives the rotating shaft 510 to rotate, due to the connection relationship between the first gear 522 and the electromagnetic assembly 521, the rotating shaft 510 can drive the electromagnetic assembly 521 to drive the first gear 522 to rotate synchronously.

In this embodiment, the driving element 500 further includes a transmission member 540 connected to the knocking element 400. A second gear 541 that meshes with the first gear 522 is arranged at one end of the transmission member 540. The first gear 522 is connected to the knocking element 400 through the transmission member 540, to enable the rotating shaft 510 to drive the knocking element 400 to rotate synchronously. By the arrangement of the above structure, the second gear 541 is in meshing connection with the first gear 522, which indicates that the rotation of the first gear 522 can simultaneously drive the second gear 541, i.e. the transmission member 540, to rotate synchronously. This meshing fit relationship makes the connection between the electromagnetic clutch 520 and the transmission member 540 tighter, ensuring more reliable operation of the intelligent singing bowl.

In this embodiment, the rotating shaft 510 is located inside the transmission member 540. A connection protruding column 410 is arranged at a top end of the knocking element 400. The connection protruding column 410 is connected to an outer wall of the transmission member 540. The transmission member 540 is connected to the knocking element 400 through the connection protruding column 410, to enable the rotating shaft 510 to drive the knocking element 400 to rotate synchronously. By the arrangement of the above structure, the singing bowl is powered on. According to a preset program, the motor 530 and the electromagnetic clutch 520 start to operate. The electromagnetic assembly 521 generates a magnetic field which attracts the rotating shaft 510 to establish a magnetic connection with the electromagnetic assembly 521. When rotating to an angle according to the preset program, the motor 530 drives the rotating shaft 510 to rotate. Due to the magnetic connection, the rotating shaft 510 can drive the electromagnetic clutch 520 to rotate synchronously. Due to the meshing fit between the second gear 541 and the first gear 522, the electromagnetic clutch 520 synchronously drives the transmission member 540 to rotate. The connection protruding column 410 at the top end of the knocking element 400 is connected to the outer wall of the transmission member 540. In this case, the transmission member 540 drives the knocking element 400 to rotate to the preset angle towards the side away from the sound production element 200. After the knocking element 400 reaches the preset angle, the motor 530 stops rotation and the electromagnetic clutch 520 is disengaged. In this case, the electromagnetic clutch 520 is no longer magnetically connected to the rotating shaft 510, and the knocking element 400 swings back only under the action of the gravity to knock the sound production element 200 for sound production.

In this embodiment, an output end 531 is arranged at one end of the motor 530 that is close to the rotating shaft 510. The rotating shaft 510 is provided with an output channel 512 that accommodates the output end 531. The output end 531 is in interference insertion into the output channel 512, to enable the motor 530 to drive the rotating shaft 510 to rotate synchronously through the output end 531. By the arrangement of the above structure, the output end 531 serves as a connection component between the motor 530 and the rotating shaft 510, which can efficiently and stably transmit rotation power output by the motor 530 to the rotating shaft 510. Due to the tight fit between the output end 531 and the rotating shaft 510, transmission stability between the motor 530 and the rotating shaft 510 is ensured, which avoids abnormal operations of the singing bowl caused by power interruption or instability. The output end 531 is in interference insertion into the output channel 512. Because of this design, even if the rotating shaft 510 shakes, the output end 531 can also maintain a stable connection relationship with the rotating shaft 510.

In this embodiment, a rotating shaft channel 523 is arranged in the electromagnetic clutch 520, and at least a part of the rotating shaft 510 is inserted into the rotating shaft channel 523. By the arrangement of the above structure, the rotating shaft channel 523 allows the rotating shaft 510 to be inserted, making it easier for the electromagnetic assembly 521 to attract the rotating shaft 510 and making the magnetic connection between them more reliable. Preferably, the transmission member 540 is internally hollow to accommodate the rotating shaft 510, and the transmission member 540 and the rotating shaft channel 523 are arranged in a corresponding manner.

In this embodiment, the driving element 500 further includes a spigot 550. The spigot 550 is adjacent to the motor 530, and sleeves an outer surface of the output end 531 to restrict movement of the output end 531. By the arrangement of the above structure, the output end 531 may have radial movement to an extent when rotating. The arrangement of the spigot 550 avoids excessive movement of the output end 531 and plays a role in positioning the motor 530. Preferably, one end of the rotating shaft 510 resists against the spigot 550, which also prevents axial movement of the rotating shaft 510.

In this embodiment, the driving element 500 further includes oppositely arranged stoppers 560. The stoppers 560 sleeve an outer wall of the rotating shaft 510, and outer walls of the stoppers 560 resist against an inner wall of the transmission member 540 to restrict movement of the rotating shaft 510. By the arrangement of the above structure, the oppositely arranged stoppers 560 are located at a position of the rotating shaft 510 that is close to a tail end. Specifically, one stopper 560 is located on one side of the rotating shaft 510 that is close to the first gear 522, and the other stopper 560 is located on one side of the rotating shaft 510 that is close to the spigot 550. The stoppers 560 are designed to restrict the radial movement of the rotating shaft 510 during the rotation of the knocking element 400, and can also cooperate with the spigot 550 to jointly restrict the movement of the rotating shaft 510. The stoppers 560 sleeve the outer wall of the rotating shaft 510, and the outer walls of the stoppers 560 resist against the inner wall of the transmission member 540. In this way, the stoppers 560 cooperate with the transmission member 540. Meanwhile, through the tight connection between the stoppers 560 and the rotating shaft 510, the function of the stoppers 560 is maximized. Preferably, a structure similar to the stoppers 560 is also correspondingly arranged on the outer wall of the transmission member 540, to restrict movement of the transmission member 540 and avoid excessive shaking of the transmission member 540 during use of the singing bowl. Preferably, a component for preventing the axial movement of the rotating shaft 510 is further arranged on the rotating shaft 510, and can be used in conjunction with the spigot 550.

In this embodiment, the supporting element 300 is provided with a swinging channel 310 that allows the knocking element 400 to swing. By the arrangement of the above structure, the supporting element 300 defines the swinging channel 310 and constrains a swinging direction of the knocking element 400 to enable the knocking element 400 to be accurately aligned with the sound production element 200 and knock the sound production element 200, thereby preventing deviation, shaking, or excessive swinging during the swinging, and also reducing mechanical wear and a failure rate.

In this embodiment, the intelligent singing bowl further includes a switch button 610. After the switch button 610 generates a signal, the control element 600 receives the signal to control turning on or turning off of the intelligent singing bowl. By the arrangement of the above structure, when the switch button 610 is pressed, the corresponding control element 600 can emit the signal, and the control element 600 can control the turning on or the turning off of the intelligent singing bowl, thereby controlling whether the knocking element 400 can knock the sound production element 200. The control element 600, as an overall control system of the singing bowl, is responsible for receiving and processing input signals from various operating components, and uniformly coordinating and controlling execution components such as the electromagnetic clutch 520, the motor 530, and the knocking element 400 according to a preset logic.

In this embodiment, the intelligent singing bowl further includes at least one control button 620. The control button 620 is electrically connected to the control element 600. The control button 620 is configured to adjust the rotation angle, rotation frequency, and operating time of the knocking element 400. By the arrangement of the above structure, the rotation angle is the rotation angle of the knocking element 400, i.e. an angle at which the knocking element 400 rotates towards the side away from the sound production element 200. If the rotation angle is larger, a volume generated by the sound production element 200 that is knocked by the knocking element 400 swinging back under the action of the gravity. The rotation frequency is a speed at which the knocking element 400 rotates per unit time, i.e. a number of times the knocking element 400 knocks the sound production element 200 for sound production. In addition, the control button 620 can also adjust operating time of the singing bowl. The operating time of the intelligent singing bowl is total working time of the singing bowl after the switch button 610 is pressed. Preferably, there are three control buttons 620, i.e. "up", "down", and "setting". A long press on the "setting" button can switch items to be adjusted. When a selected item to be adjusted is frequency, if a default frequency is 30 s/time, the "up" and "down" buttons can adjust the frequency within a frequency range of 15 s–1 h/time. When a selected item to be adjusted is a rotation angle, if a default rotation angle is 45°, the "up" and "down" buttons can adjust the angle within an angle range of 15° to 90°. When a selected item to be adjusted is operating time, if default operating time is 1 h, the "up" and "down" buttons can adjust the operating time within a time range of 0 to 15 h. For example, if the knocking frequency of the knocking element 400 is 30 times, the electromagnetic clutch 520 and the motor 530 are powered on. After the knocking element 400 rotates to the preset angle, the electromagnetic clutch 520 and the motor 530 are turned off. In this case, a preset program in the control element 600 counts down 30 s. After the countdown ends, the electromagnetic clutch 520 and the motor 530 are powered on again. The operations are carried out repeatedly in this way till the total operating time. In the singing bowl, a speed of the motor 530 is constant. In preset program I, an angle at which knocking element 400 rises is set to 30°. In preset program II, an angle at which knocking element 400 rises is set to 60°. In this case, time required by the motor 530 to drive the knocking element 400 to rotate 60° is twice time required by the motor 530 to drive the knocking element 400 to rotate 30°. The knocking frequency is calculated based on off time of the motor 530 and the electromagnetic clutch 520 after the motor 530 drives the knocking element 400 to rotate to a corresponding angle. Based on this time, the preset program in the control element 600 starts the countdown of corresponding frequency time.

It should be noted that the knocking element 400 is composed of two parts: an upper shell and a lower shell. The upper shell and the lower shell are detachably connected by a screw. This design allows a user to replace different lower shells. The upper shell of the knocking element 400 is connected to the rotating shaft 510, and the connection protruding column 410 is also located on the upper shell part. This design is intended to maintain the connection relationship between the knocking element 400 and the driving element 500 even when the user replaces the lower shell. In addition, a patch is attached to a hammer head part at a the bottom of the lower shell of the sound production element 200. Attachment of patches with different thicknesses can enable the sound production element 200 to produce sounds with different timbres after the knocking element 400 knocks the sound production element 200. Correspondingly, at the same rotation angle, after the patch is attached, volumes of sounds produced by the sound production element 200 knocked by the knocking element 400 are also different. The user can replace, based on a personal preference, the patches with different thicknesses or replace the lower shell of the knocking element 400 that is attached with the patch.

In this embodiment, the intelligent singing bowl further includes a display screen 630. The display screen 630 is electrically connected to the control element 600. The display screen 630 displays the rotation angle, rotation frequency, and operating time of the knocking element 400 in real time. By the arrangement of the above structure, when a user adjusts the rotation angle, rotation frequency, and operating time of the knocking element 400, the display screen 630 can display a current adjusted value in real time. Current setting parameters and operating states can be intuitively obtained through the display screen 630, which improves visualization of operations and convenience of use, and can make it convenient for the user to make adaptive adjustments based on the current parameters. Preferably, the display screen 630 is located on one side, close to the sound production element 200, of an upper end of the supporting element 300. In this way, it is convenient for user operation. Correspondingly, the control button 620 is arranged close to the display screen 630.

In this embodiment, the intelligent singing bowl further includes a charging port 640. The intelligent singing bowl is charged through the charging port 640. By the arrangement of the above structure, the arrangement of the charging port 640 can provide the power source to charge the intelligent singing bowl, which not only improves endurance of the singing bowl, but also improves convenience and applicability of the singing bowl. It is especially applicable to mobile use scenarios. Preferably, the charging port 640 is electrically connected to the control element 600 to implement intelligent monitoring and charging protection on a battery level state of the singing bowl. Preferably, the charging port 640 is arranged at a bottom of the supporting element 300, and the supporting element 300 is correspondingly provided with a through hole corresponding to the charging port 640. A user can plug a data cable with a Type-C interface or a Micro USB interface into the corresponding through hole to implement electrical connection with the charging port 640, thereby charging the singing bowl. In addition, a periphery of an outer wall of the supporting element 300 with the through hole corresponding to the charging port 640 is designed with a sunken recess. From a side view, the supporting element 300 still has a smooth curved contour. This design balances aesthetics and the functionality of the singing bowl, which ensures overall coordination of the appearance and facilitates user operation. In addition, the switch button 610 is close to the charging port 640 to facilitate the user operation.

In this embodiment, the intelligent singing bowl further includes a battery 650. The battery 650 is located inside the base 100. The charging port 640 is configured to be connected with an external power source to supply power to the battery 650. By the arrangement of the above structure, the battery 650 is a rechargeable battery for providing working power for the singing bowl. Due to the arrangement of the battery 650, the intelligent singing bowl can have an independent power supplying capability. In a case that the battery 650 has sufficient electricity, the singing bowl can be used in a mobile manner without an external power cord. In a case that the battery 650 has low battery, the charging port 640 can be connected to the external power source to charge the battery 650, thus ensuring normal use of the singing bowl. Preferably, the battery 650 is located inside the base 100 and is electrically connected to the control element 600. During daily use, the battery 650 intelligently distributes electrical energy through the control element 600. Preferably, the display screen 630 can also display a current battery level of the singing bowl. When the battery level of the singing bowl is below 5%, an icon of the battery 650 and an indicator light on the display screen 630 may flash. The indicator light is yellow during powered-on charging, is green during powered-off charging, and is yellow when the battery s fully charged. Preferably, there are two control elements 600, one of which is electrically connected to the switch button 610, the battery 650, and the charging port 640 and is located inside the base 100, and the other one of which is electrically connected to the control button 620 and the display screen 630 and is located inside the supporting element 300.

In this embodiment, the base 100 is provided with a mounting slot 110, and a bottom end of the sound production element 200 is movably connected to the mounting slot 110. By the arrangement of the above structure, the design of the mounting slot 110 can ensure that the sound production element 200 is firmly fixed on the base 100 during use. The mounting slot 110 matches a size of the bottom end of the sound production element 200. Without the help of an external force or other fixing members, even when the knocking element 400 knocks the sound production element 200, the sound production element 200 can be reliably fixed in the mounting slot 110. Meanwhile, this detachable fit relationship makes it easier to replace the sound production element 200. Preferably, the mounting slot 110 is formed by combining two slots with matching sizes. A diameter of the slot 100 gradually decreases from the base 100 to a position at which the sound production element 200 is mounted in the slot, and matches the size of the bottom end of the sound production element 200. The combination of the two slots with the matching sizes is to adapt to sound production elements 200 with different sizes. The two slots are designed to be detachable for easy replacement by a user.

In this embodiment, at least a part of a bottom surface of the base 100 is of a planar structure. The bottom surface resists against a supporting surface, and the bottom surface of the base 100 is provided with an antislip member 120. By the arrangement of the above structure, at least a part of the bottom surface of the base 100 is configured to be planar. The planar structure can enable the entire singing bowl to better resist against the supporting surface, which improves stability of contact between the base 100 and the supporting surface, and helps improve overall balance of the singing bowl. Especially in a process that the knocking element 400 repeatedly knocks the sound production element 200, displacement of the entire singing bowl due to vibrations of the sound production element 200 can be effectively avoided, which improves reliability and safety of the singing bowl to a particular extent. The arrangement of the antislip member 120 is intended to enhance friction between the bottom of the singing bowl and the supporting surface, thereby effectively preventing the singing bowl from sliding or moving during use. Preferably, the bottom surface is of the planar structure, and the antislip member 120 is arranged in a diagonal direction on the bottom surface. In this way, the intelligent singing bowl can better resist against the supporting surface, thus improving overall placement stability and preventing the displacement of the entire singing bowl due to the vibrations in the knocking process.

In this embodiment, the supporting element 300 and the base 100 are of an integrated structure. By the arrangement of the above structure, the integrated design has advantages of structural stability, high strength, simple appearance, and the like, which can also improve the aesthetics of the singing bowl. Preferably, the integrated structure includes an upper shell and a lower shell which are connected by a buckle or a screw. The upper shell and the lower shell define an accommodating space to accommodate components such as the driving element 500 and the control element 600.

In this embodiment, the motor 530 is a stepping motor, and the electromagnetic clutch 520 is a gear electromagnetic clutch. By the arrangement of the above structure, the stepping motor can precisely control the rotation angle and rotation frequency based on an input signal. Due to an inherent stepping operation characteristic of the stepping motor, the stepping motor rotates a fixed stepping angle with each input pulse signal. Therefore, high-precision control on the rotation angle and the rotation speed can be respectively implemented by controlling a pulse number and a frequency. It has advantages of fast response, high control precision, simple structure, and the like. The gear electromagnetic clutch combines advantages of the gear transmission and the electromagnetic clutch. By powering on and powering off the electromagnetic assembly 521, attraction and release of the rotating shaft 510 can be quickly and accurately controlled. Specifically, when powered on, the electromagnetic assembly 521 generates a magnetic force, which drives the rotating shaft 510 to be attracted by the electromagnetic assembly 521, thereby transmitting precise motion of the stepping motor through the rotating shaft 510. When the power is cut off, the magnetic force disappears, and the rotating shaft 510 is disconnected from the electromagnetic assembly 521, and the power transmission is interrupted. This design not only inherits the characteristics of fast response and convenient control of the electromagnetic clutch 520, but also integrates the advantages of the stepping motor, thus further improving control precision and reliability of a system.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. An intelligent singing bowl, comprising:

a base (100);

a sound production element (200), wherein the sound production element (200) is connected to an upper surface of the base (100);

a supporting element (300), wherein the supporting element (300) is connected to the base (100) and extends upwards from the base (100);

a knocking element (400), wherein a bottom end of the knocking element (400) is located on one side of the sound production element (200); and a driving element (500), wherein the driving element (500) is located inside the supporting element (300); the driving element (500) comprises a rotating shaft (510), an electromagnetic clutch (520), and a motor (530); a top end of the knocking element (400) is rotatably connected to a middle of the rotating shaft (510); the electromagnetic clutch (520) and the motor (530) are respectively connected to two ends of the rotating shaft (510); the electromagnetic clutch (520) attracts or releases the rotating shaft (510); when the electromagnetic clutch (520) attracts the rotating shaft (510), the rotating shaft (510) is fixedly connected to the knocking element (400); and the motor (530) drives the rotating shaft (510) to rotate, to enable the rotating shaft (510) to drive the knocking element (400) to rotate synchronously.

2. The intelligent singing bowl according to claim 1, further comprising a control element (600), wherein the control element (600) controls a rotation angle and rotation frequency of the knocking element (400).

3. The intelligent singing bowl according to claim 1, wherein the electromagnetic clutch (520) comprises an electromagnetic assembly (521); the electromagnetic assembly (521) is connected to the knocking element (400); and after the electromagnetic clutch (520) is turned on, the electromagnetic assembly (521) attracts at least a part of the rotating shaft (510), to enable the rotating shaft (510) to drive the knocking element (400) to rotate synchronously.

4. The intelligent singing bowl according to claim 3, wherein the electromagnetic clutch (520) further comprises a first gear (522) connected to the knocking element (400); the first gear (522) is fixedly connected to the electromagnetic assembly (521); and the electromagnetic assembly (521) is connected to the knocking element (400) through the first gear (522), to enable the rotating shaft (510) to drive the knocking element (400) to rotate synchronously.

5. The intelligent singing bowl according to claim 4, wherein the driving element (500) further comprises a transmission member (540) connected to the knocking element (400); a second gear (541) that meshes with the first gear (522) is arranged at one end of the transmission member (540); and the first gear (522) is connected to the knocking element (400) through the transmission member (540), to enable the rotating shaft (510) to drive the knocking element (400) to rotate synchronously.

6. The intelligent singing bowl according to claim 5, wherein the rotating shaft (510) is located inside the transmission member (540); a connection protruding column (410) is arranged at a top end of the knocking element (400); the connection protruding column (410) is connected to an outer wall of the transmission member (540); and the transmission member (540) is connected to the knocking element (400) through the connection protruding column (410), to enable the rotating shaft (510) to drive the knocking element (400) to rotate synchronously.

7. The intelligent singing bowl according to claim 1, wherein an output end (531) is arranged at one end of the motor (530) that is close to the rotating shaft (510); the rotating shaft (510) is provided with an output channel (512) that accommodates the output end (531); and the output end (531) is in interference insertion into the output channel (512), to enable the motor (530) to drive the rotating shaft (510) to rotate synchronously through the output end (531).

8. The intelligent singing bowl according to claim 1, wherein a rotating shaft channel (523) is arranged in the electromagnetic clutch (520), and at least a part of the rotating shaft (510) is inserted into the rotating shaft channel (523).

9. The intelligent singing bowl according to claim 7, wherein the driving element (500) further comprises a spigot (550); and the spigot (550) is adjacent to the motor (530), and sleeves an outer surface of the output end (531) to restrict movement of the output end (531).

10. The intelligent singing bowl according to claim 5, wherein the driving element (500) further comprises oppositely arranged stoppers (560); the stoppers (560) sleeve an outer wall of the rotating shaft (510); and outer walls of the stoppers (560) resist against an inner wall of the transmission member (540) to restrict movement of the rotating shaft (510).

11. The intelligent singing bowl according to claim 1, wherein the supporting element (300) is provided with a swinging channel (310) that allows the knocking element (400) to swing.

12. The intelligent singing bowl according to claim 2, further comprising a switch button (610), wherein after the switch button (610) generates a signal, the control element (600) receives the signal to control turning on or turning off of the intelligent singing bowl.

13. The intelligent singing bowl according to claim 2, further comprising at least one control button (620), wherein the control button (620) is electrically connected to the control element (600); and the control button (620) is configured to adjust the rotation angle, rotation frequency, and operating time of the knocking element (400).

14. The intelligent singing bowl according to claim 13, further comprising a display screen (630), wherein the display screen (630) is electrically connected to the control element (600); and the display screen (630) displays the rotation angle, rotation frequency, and operating time of the knocking element (400) in real time.

15. The intelligent singing bowl according to claim 1, further comprising a charging port (640), wherein the intelligent singing bowl is charged through the charging port (640).

16. The intelligent singing bowl according to claim 15, further comprising a battery (650), wherein the battery (650) is located inside the base (100), and the charging port (640) is configured to be connected with an external power source to supply power to the battery (650).

17. The intelligent singing bowl according to claim 1, wherein the base (100) is provided with a mounting slot (110), and a bottom end of the sound production element (200) is movably connected to the mounting slot (110).

18. The intelligent singing bowl according to claim 1, wherein at least a part of a bottom surface of the base (100) is of a planar structure for resisting against a supporting surface, and the bottom surface of the base (100) is provided with an antislip member (120).

19. The intelligent singing bowl according to claim 1, wherein the supporting element (300) and the base (100) are of an integrated structure.

20. The intelligent singing bowl according to claim 1, wherein the motor (530) is a stepping motor, and the electromagnetic clutch (520) is a gear electromagnetic clutch.

* * * * *